UNITED STATES PATENT OFFICE.

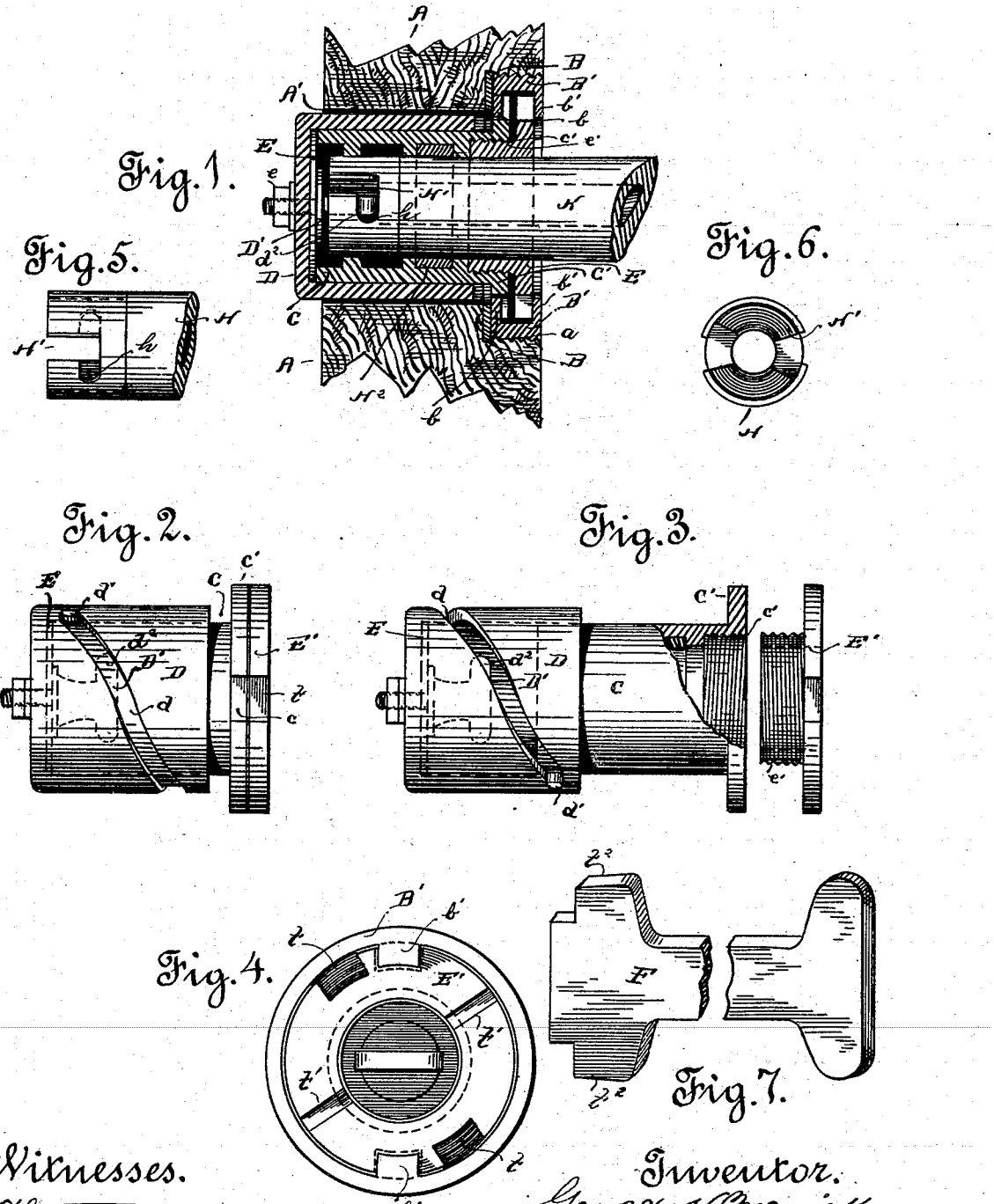

GEORGE H. MERRICK, OF SAN FRANCISCO, CALIFORNIA.

BUSHING AND FAUCET FOR BARRELS.

SPECIFICATION forming part of Letters Patent No. 503,767, dated August 22, 1893.

Application filed April 20, 1892. Renewed May 4, 1893. Serial No. 473,030. (No model.)

*To all whom it may concern:*

Be it known that I, GEORGE H. MERRICK, a citizen of the United States, residing at San Francisco, in the county of San Francisco and State of California, have invented certain new and useful Improvements in Bushings and Faucets for Barrels; and I do hereby declare the following to be a full, clear, and exact description of said invention, such as will enable others skilled in the art to which it most nearly appertains to make, use, and practice the same.

My invention has relation to certain new and useful improvements in bushings and faucets for barrels which consists in the arrangement of parts and details of construction as will be hereinafter more fully set forth in the drawings and described and pointed out in the specification.

The object of my present invention is to provide a lock bushing for barrels, adapted to be opened and closed by rotation of the faucet fitting therein which shall consist of an immovable bushing secured with the barrel opening and a sleeve or valve having a longitudinal movement upon the stem of the fixed bushing, said sleeve or valve being provided with an opening for the passage of liquid therethrough when it is moved outward upon the fixed bushing.

Referring to the drawings forming a part of this application wherein similar letters of reference are used to denote corresponding parts throughout the entire specification and several views, Figure 1 is a longitudinal sectional view of the bushing secured within the wood, showing the faucet connected thereto. Fig. 2 is a side view of the bushing closed. Fig. 3 is a similar view showing the bushing opened. Fig. 4 is a top plan of Fig. 2. Fig. 5 is an end view of the faucet. Fig. 6 is a bottom plan of Fig. 5, and Fig. 7 is a broken view of the key for securing the bushing in the barrel.

The letter A is used to indicate a portion of a barrel, which is provided with opening A', which opening is enlarged at its upper end in order to form a projecting annular shoulder $a$.

Within opening A', and upon shoulder $a$ is located a packing ring B, which is firmly held in place by means of a metallic ring B' which is secured to the wall of the enlarged portion of said opening A'. This ring is provided with upper and lower inwardly projecting lugs $b$, $b'$, for the purpose of locking the bushing, as hereinafter described.

Within the opening A' fits a bushing C, having annular shoulder C', which bears upon a packing ring located upon the shoulder $a$ of said opening. The annular shoulder of the bushing is provided with a slot $c$, which permits of the bushing passing over the lugs $b$, $b'$. The lower end or bottom of the bushing is open in order to allow of liquid passing therethrough, but if so desired, same may be made closed and perforations provided.

Upon the bushing C works a sleeve or valve D, which valve has cut therein a spiral slot $d$, through which a pin $d'$ passes and is secured to the wall of bushing in any suitable manner.

Within the interior of the valve is located a valve key D', which is held in place by a nut $e$, secured upon the screw threaded stem thereof, as shown. This valve key serves to maintain a packing ring E in place, so that when the valve is closed a tight seat will be provided for the end of bushing C. The upper end of the bushing C is internally screw-threaded as shown at $c'$ and within same works the screw-threaded stem $e'$ of a lock nut or ring E'. This ring or nut has a slot or opening $f$, similar to those formed in the bushing, for the purpose of permitting same to pass lugs $b'$.

The lock nut or ring E', is provided with a key seat $f'$, in which fit arms $f^2$ of lock key F. After the valve or sleeve has been secured to the bushing, the latter is placed within the opening of barrel, the annular flange or shoulder thereof resting on the packing held upon the projecting shoulder of the opening. Said bushing is prevented from turning, or displacement, by means of the lugs $b$, which fit in the openings or slots $c$. Prior to placing of bushing within the opening of barrel, the lock nut or ring is screwed into the threaded end thereof.

In order to firmly secure the bushing within barrel, the lock nut or ring is unscrewed by means of the key F, which forces same tightly under surface of lugs $b'$ of ring B'. The unscrewing of lock nut serves to force the annular shoulder of the bushing upon the packing ring B, and consequently insures a tight joint. When thus secured the barrel may be shipped and transported without fear of retained liquid escaping.

In order to release the contents of the barrel, or open the bushing, the end of faucet H is provided with a key seat H', which fits over the valve key D', when inserted within bushing. By simply turning the faucet, arms $d^2$, of valve key, move into the lateral slot $h$ of key seat. When in this position, shown in Fig. 1, the faucet is locked within the bushing and by giving further turn or movement to said faucet, sleeve or valve D is forced to move downward upon bushing, inasmuch as $d'$ works within spiral slot. Consequently as the valve rotates it is moved longitudinally upon the bushing. The retained liquid flows into the faucet through spiral slot of valve, or through perforations which may be formed in lower end thereof. In order to close valve it is only necessary that an opposite turn be given the faucet, which causes the valve to move upward upon the bushing.

I do not confine myself to the exact details of construction and arrangement illustrated, as minor changes may be made therein without departing from my invention.

In order to form a perfectly tight joint between faucet and bushing wall I provide the packing ring $H^2$, which bears thereagainst.

Having thus fully described my invention, what I claim, and desire to secure by Letters Patent, is—

1. The combination with a retaining ring secured within the barrel opening, of a bushing fitting within said opening and retained therein by said ring, and of a screw threaded lock nut fitting within the end of the bushing and adapted to firmly hold the same within the barrel opening.

2. The combination with the bushing, having an internally screw threaded end, of the lock nut having a screw threaded stem fitting within the threaded end of the bushing, said nut adapted when unscrewed to bind against a fixed stop in the barrel opening and thereby hold the bushing.

3. The combination with the retaining ring, provided with inwardly projecting lugs, of a bushing having openings therein engaging said lugs, screw threaded locking nut fitting within the bushing, said nut having openings therein corresponding with the bushing openings, and a lock key for rotating said lock nut, as and for the purpose set forth.

4. The combination with an immovable bushing and means for securing the same in place, of a sleeve or valve slidably mounted upon the bushing and provided with a passage or port for the flow of liquid, the valve key mounted within the valve having arms $d^2$ and provided with a threaded shank, and a faucet having its inner end slotted to receive the arms of the valve key and provided with a lateral slot into which said arms are forced whereby the faucet is locked to the valve key so that a further movement of the faucet rotates the valve or sleeve and enables the liquid to be discharged, substantially as herein described.

In testimony whereof I affix my signature in presence of two witnesses.

GEORGE H. MERRICK.

Witnesses:
E. M. MORGAN,
N. A. ACKER.